(12) United States Patent
Miettinen

(10) Patent No.: US 8,880,663 B2
(45) Date of Patent: Nov. 4, 2014

(54) METHOD AND APPARATUS FOR SHARING USER INFORMATION

(75) Inventor: Markus Juhani Miettinen, Vantaa (FI)

(73) Assignee: Nokia Corporation, Espoo (FI)

(*) Notice: Subject to any disclaimer, the term of this patent is extended or adjusted under 35 U.S.C. 154(b) by 631 days.

(21) Appl. No.: 12/891,374

(22) Filed: Sep. 27, 2010

(65) Prior Publication Data

US 2012/0079086 A1 Mar. 29, 2012

(51) Int. Cl.
*G06F 15/177* (2006.01)
*G06Q 10/10* (2012.01)
*H04L 12/58* (2006.01)

(52) U.S. Cl.
CPC ............... *H04L 12/58* (2013.01); *H04L 51/28* (2013.01); *G06Q 10/10* (2013.01)
USPC .......... 709/222; 709/220; 709/221; 455/41.1; 455/410; 455/414.1

(58) Field of Classification Search
CPC ......... G06Q 10/10; H04L 12/58; H04L 51/28
USPC ............... 709/220–222; 455/41.1, 410, 414.1
See application file for complete search history.

(56) References Cited

U.S. PATENT DOCUMENTS

| 7,877,082 B2* | 1/2011 | Eagle et al. ................ 455/414.1 |
| 2006/0268896 A1* | 11/2006 | Kotola et al. ................ 370/400 |
| 2006/0276133 A1 | 12/2006 | Ly et al. |
| 2007/0197163 A1* | 8/2007 | Robertson .................... 455/26.1 |
| 2009/0132655 A1* | 5/2009 | Behrens ........................ 709/204 |
| 2009/0306834 A1* | 12/2009 | Hjelm et al. ...................... 701/1 |
| 2010/0138481 A1* | 6/2010 | Behrens ........................ 709/203 |
| 2011/0081886 A1* | 4/2011 | Sheymov et al. ............. 455/410 |
| 2012/0077432 A1* | 3/2012 | Rose et al. ................... 455/41.1 |

FOREIGN PATENT DOCUMENTS

| JP | 2008-84201 A | | 4/2008 |
| JP | 2008084201 A | * | 4/2008 |
| WO | WO 2008/132241 A2 | | 11/2008 |

OTHER PUBLICATIONS

Eclectro last.fm lovewall installation (video), Baan, Nov. 16, 2008, http://www.hypernarrative.com/wordpress/category/music/, pp. 1-5.
Instant Places, ubicomp@uminho, accessed on Nov. 11, 2010, http://ubicomp.algoritmi.uminho.pt/instantplaces/, pp. 1-5.
Your Bluetooth name? smh, accessed on: Nov. 17, 2010, http://www.esato.com/archive/t.php?t-114117,1.html, pp. 1-5.

* cited by examiner

*Primary Examiner* — Michael C Lai
(74) *Attorney, Agent, or Firm* — Ditthavong & Steiner, P.C.

(57) ABSTRACT

An approach is presented for sharing user information among devices. The identity discovery module determines one or more user identifiers. Further, the identity discovery module determines to generate a first device identifier based, at least in part, on the one or more user identifiers. Then, the identity discovery module determines to present the first device identifier in place of a second identifier as a discoverable identity of a device.

15 Claims, 10 Drawing Sheets

METHOD AND APPARATUS FOR SHARING USER INFORMATION

BACKGROUND

Service providers and device manufacturers (e.g., wireless, cellular, etc.) are continually challenged to deliver value and convenience to consumers by, for example, providing compelling network services. One area of interest has been the development of services for collaborating, sharing content, and/or communicating between users and/or user devices. However, in many cases, the services rely on online identities (e.g., user names or other identifiers) associated with each user to initiate the collaboration, sharing, communication, etc. over the services. In other words, users typically must first discover the online identities of the people with whom they wish to interact. Traditionally, in order to discover information like an online user identity (e.g., instant messenger screen name), the user can manually request the information from another user. Thereafter, the user can manually enter the user information in, for instance, a device or terminal to interact with the other user over a corresponding service (e.g., by manually adding the other user's instant messenger screen name to a messaging client to start a messaging session). Accordingly, service providers and device manufacturers face significant technical challenges to enabling easier or less manually burdensome discovery of user information (e.g., online identity information).

SOME EXAMPLE EMBODIMENTS

Therefore, there is a need for an approach for efficiently and easily sharing and discovering user information (e.g., online identities).

According to one embodiment, a method comprises determining one or more user identifiers. The method also comprises determining to generate a first device identifier based, at least in part, on the one or more user identifiers. The method further comprises determining to present the first device identifier in place of a second device identifier as a discoverable identity of a device.

According to another embodiment, an apparatus comprises at least one processor, and at least one memory including computer program code, the at least one memory and the computer program code configured to, with the at least one processor, cause, at least in part, the apparatus to determine one or more user identifiers. The apparatus is also caused to determine to generate a first device identifier based, at least in part, on the one or more user identifiers. The apparatus is further caused to determine to present the first device identifier in place of a second identifier as a discoverable identity of a device.

According to another embodiment, a computer-readable storage medium carries one or more sequences of one or more instructions which, when executed by one or more processors, cause, at least in part, an apparatus to determine one or more user identifiers. The apparatus is also caused to determine to generate a first device identifier based, at least in part, on the one or more user identifiers. The apparatus is further caused to determine to present the first device identifier in place of a second identifier as a discoverable identity of a device.

According to another embodiment, an apparatus comprises means for determining one or more user identifiers. The apparatus also comprises means for determining to generate a first device identifier based, at least in part, on the one or more user identifiers. The apparatus further comprises means for determining to present the first device identifier in place of a second device identifier as a discoverable identity of a device.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for sharing user information among devices are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to discovering user identity or online identity information, it is contemplated that the approach described herein is applicable to any information that can be shared among a plurality of devices.

Figure 1:
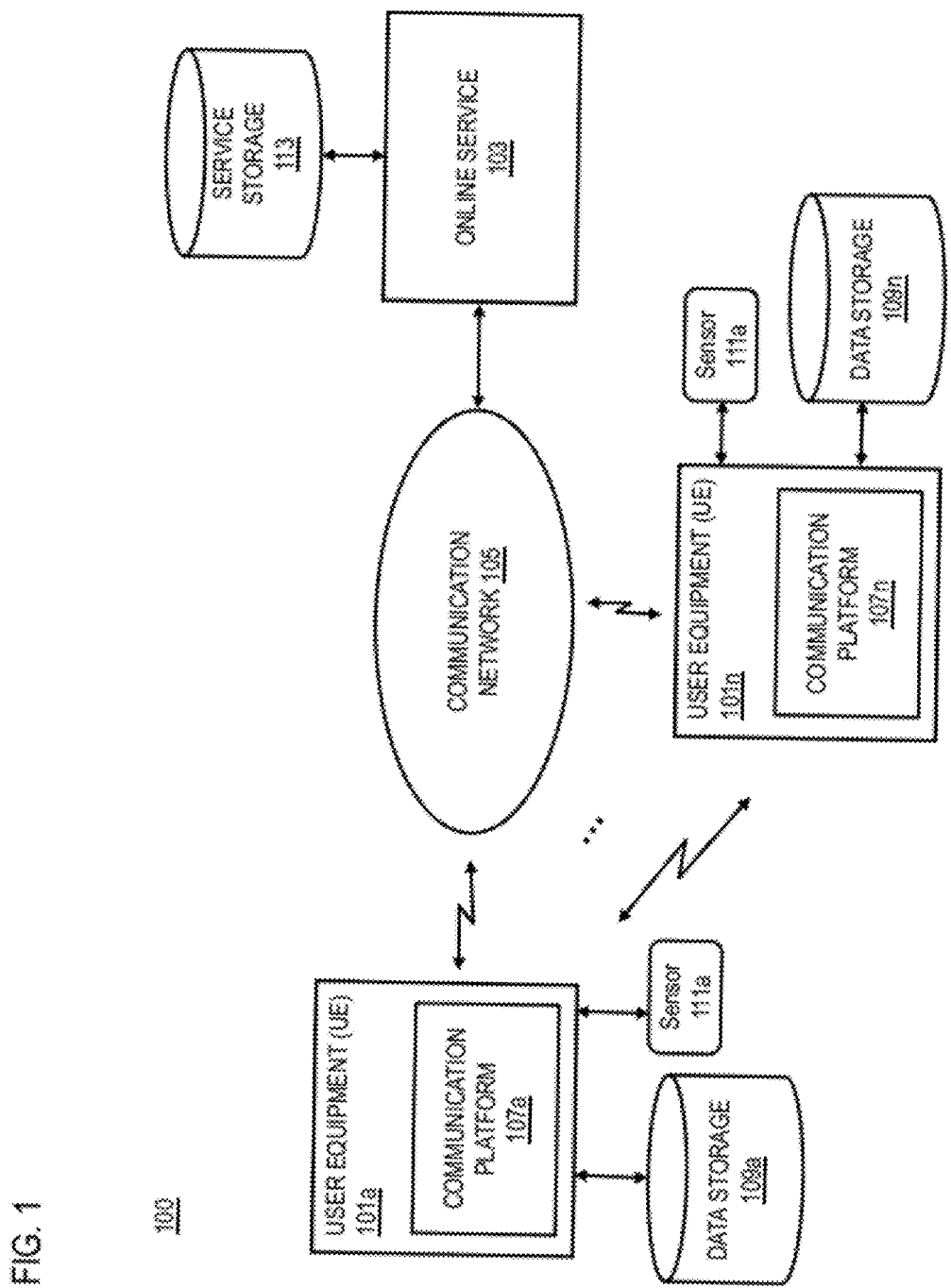
FIG. 1 is a diagram of a system capable of sharing user information among devices, according to one embodiment.

FIG. 1 is a diagram of a system capable of sharing user information among devices, according to one embodiment. As discussed previously, services for collaborating, sharing, and communicating among users often rely on assigning online identities to the users. These online identities, for instance, are used to address and/or route service messages, content, etc. as well as for providing for security and authentication of access. As a result, users historically have had to find ways to discover the identities of other users to take advantage of the services. As noted above, one traditional method for discovering the online identities of other users is to manually request the information from the users themselves. Another traditional method is to search directories, contact lists, etc. provided by the services or otherwise made available. For example, a user can search for friends or potential contacts by specifying search terms (e.g., an email address, a characteristics, etc.) to identify the contacts that the user is interested in. In some cases, friends or potential contacts may also be discovered through recommendations give by other users. However, under the described traditional scenarios, discovering the online identities of other users remains manually intensive. Moreover, discovering the online identities of other users that one has just met and does not know very much about can also be very challenging because there is little information or criteria available for defining a search for corresponding online identities.

These obstacles, for instance, make searching for online identities time consuming and burdensome, thereby potentially discouraging users from using affected services. In addition, even if the searching features based on search criteria are available, such features often require the other users to enter the search criteria, and thus may not be feasible if the other users do not have any information to enter as the search criteria. Further, because there are often a considerable number of users (e.g., millions of users) for any given service (e.g., a social networking service, instant messaging service, etc.) that can be searched, the search criteria for the user are not often sufficient to specifically locate the user whose information is of interest. As a result, the search results of the online identity may need to be examined to find the user of interest, which can be tedious and time consuming. Especially in an event or a meeting where only a set number of people attend (e.g., business meetings), attendants may desire to quickly discover other attendants (i.e. people of relevance) and retrieve information about them. Accordingly, a convenient and easy method of discovering a person and retrieving information about the person is desired.

To address this problem, a system 100 of FIG. 1 introduces the capability to share user information among devices to facilitate discovery of identity information. In one embodiment, the system 100 determines one or more user identifiers (e.g., online identities such as a user name or alias associated with a particular user with respect to one or more services) for sharing with other devices. The system 100 then generates a device identifier based on the determined user identifiers. As used herein, the term "device identifier" refers to a name or other label that is associated with the device over a particular network or wireless protocol. For example, the device identifier can be a Bluetooth identifier (ID) that is discoverable (i.e., detectable and/or identifiable by other devices over the same wireless protocol) when the Bluetooth radio of the device is activated. Other examples of device identifiers include WiFi Service Set Identifier (SSID), a device name over a local area network protocol (e.g., Windows Operating System device name), and the like.

In one embodiment, the generated device identifier may specify the user identifiers, information about the user identifiers (e.g., what service they are associated with), and/or any other related information such as information about the device and/or retrieval of user information. Then, the system 100 presents the generated device identifier in place of a current device identifier associated with the device as a discoverable identity of a device (e.g., user equipment (UEs) 101a-101n; also collectively referred to as UE 101). For example, if the user wants to make an email address available for discovery by other nearby devices, the system 100 can generate a device identifier (e.g., the first device identifier referenced above in the "Some Example Embodiments" section) based on the email address (e.g., device identifier="Email: mail@email.com") and then use the generated device identifier in place of any current device identifier (e.g., the second device identifier referenced above in the "Some Example Embodiments" section). In the above example, the generated device identifier specifies both the service (e.g., "Email:") and the corresponding online identity (e.g., "mail@email.com). In this way, the system 100 enables any nearby device that can detect the device identifier (e.g., via Bluetooth if the device identifier is a Bluetooth ID) to easily discover the shared online identity information. In some embodiments, the nearby devices can execute an application, for instance, to automatically detect the shared device identifier, parse the device identifier to obtain the online identity (e.g., to identity the service and/or any related information), and then initiate related tasks (e.g., store the online identity in a contact list, initiate a communication session using the online identity and corresponding service, etc.). In one embodiment, when the sharing is complete, the system 100 can restore the previous device identifier.

In one sample use case, when a software application that is enabled to perform the approach described herein is activated at a mobile device, the application activates the device's wireless protocol such as Bluetooth radio, and sets the Bluetooth name of the device from the original device identifier to a generated device identifier (e.g., a device identifier specifying the online identity(ies) to be shared) as a discoverable identity via Bluetooth. Then, nearby users (e.g., users in the same meeting room) may discover the device identifier including the shared online identities. Thus, the approach described herein provides an easy way to share user information with other users. When certain conditions are satisfied, the Bluetooth name of the device is reverted back to the second device identifier from the first device identifier. For example, when a predetermined period of time expires and/or context changes (e.g., exiting the meeting room), the Bluetooth name may be reverted back to the second device identifier. The first device identifier as the Bluetooth name may include an online user identifier (e.g., user name for a social networking service) as well as a real name of the user, such that the user of relevance can easily recognize which online user identifier belongs to which user.

In another sample use case, the software application of the device may perform a Bluetooth scan upon activation to discover other users with their respective discoverable identities. The software application may also retrieve additional user information of the other users after discovering the other users, and store it in an address book of the user device. The additional user information may be retrieved from an internet service, the user's device, etc. For enhanced security, the internet service may require a passcode to access the additional user information. The passcode may be provided along with the discoverable device identifier, such that the passcode may be provided to the internet service for retrieval of the additional user information. In another embodiment, the device identifier including the online identities may be encrypted (e.g., using a public key infrastructure) so that only authorized users may retrieve the online identities. In yet another embodiment, users may register or otherwise record a hardware identifier such as the media access control (MAC) addresses of their devices' Bluetooth radio. Upon discovering the device identifier of a sharing device, the discovering device may compare the MAC address of the sharing device with a list of registered MAC addresses for authentication. For example, a group of coworkers may register their devices' MAC addresses to ensure that any shared online identities come from authorized or known users. This helps verifying that the device discovered via the device identifier truly belongs to the user.

As shown in FIG. 1, the system 100 may comprise multiple UEs 101a-101n having connectivity to an online service 103, via the communication network 105, and to other components such as an identity discovery module 107, a data storage 109 and a sensor 111. By way of example, the online service 103 provides or generates online identities for users of the service. These online identities may be shared and discovered using the approach described herein. Although only one online service 103 is depicted in FIG. 1, it is contemplated that the UEs 101 may have connectivity to any number of online services for collaborating, sharing, communicating, etc. among multiple devices. The communication may be performed between one or more of the UEs 101a-101n and the online service 103 via the communication network 105. The communication may also be performed between the UEs 101a-101n, without relying on the communication network 105. For example, the UEs 101a-101n may have a short range wireless connectivity (e.g., Bluetooth, near field communications, etc.), which allows a direct connection between the UEs 101a-101n without relying on the connection to the communication network 105. The UE 101 may include an identity discovery module 107 to manage communication between the UEs 101a-101n as well as communication with the online service 103 for performing all or a portion of the processes for sharing and/or discovering online identities or other user information. The UE 101 also may be connected to the data storage 109 to store information such as information about a user (e.g., online identities). Further, the UE 101 may be connected to the sensor 111 to acquire context information. The sensor 111 may include a sound sensor, a speed sensor, a location sensor such as a global positioning system sensor, etc. to acquire context information.

In one embodiment, the UE 101 may receive a request from an application for generating a first device identifier that includes or encodes one or more user identifiers, wherein at least one of the user identifiers is associated with the application. For example, as an application in the UE 101 is activated, the application may request to generate the first device identifier based on the user identifiers. The user identifier may be a user online identity associated with the application. In another example, the user identifier may also be the user identifier of the online service 103, instead of the user identifier of the application in the UE 101. Further, the second device identifier (e.g., the device identifier normally associated with the UE 101) may be a default device identifier for the device, and the first device identifier may be presented instead of the second device identifier when certain conditions are satisfied. For example, the second device identifier may be "Mike'sDevice," reflecting the name designated for the device, the user identifier is set as Mike211 for the application in the UE 101, and then the first device identifier may be "Mike211_meeting1," which includes information about the user identifier.

Further, the UE 101 may associate the user identifiers with functions, applications, services or a combination thereof, and include this association in the first device identifier. For example, the user identifier Mike211 may be associated with a social networking service, and therefore first device identifier may include the association between the user identifier Mike211 and the social networking service. As one example, the first device identifier may include both "Mike211" and "SocialNetworking" to indicate the association between the user identifier Mike211 and the social networking service. In addition, the UE 101 may also associate a passcode with the user identifier, wherein the passcode authenticates access to functions, applications, services or a combination thereof associated with the user identifier, and include the passcode in the first identifier. For example, if the UE 101n retrieves the first device identifier having the user identifier of the UE 101a with the passcode from the UE 101a, then the UE 101n may use the retrieved user identifier and the passcode to access information about the user via the functions, application, and/or services associated with the user identifier. In one embodiment, the identifier may also be encrypted (e.g., via a public key infrastructure) so that only devices possessing the corresponding decryption keys by access the user identifier and/or passcode in the device identifier.

Furthermore, the UE 101 may determine hardware identifier(s) associated with the UE 101 and associate the hardware identifier with the first device identifiers. The user identifiers are authenticated based on the hardware identifier. The hardware identifier may be a device-specific media access control (MAC) address. For example, if the UE 101n retrieves the first device identifier having the user identifier of the UE 101a along with a Bluetooth MAC address of the UE 101a, the UE 101n can acquire a Bluetooth MAC address registered under the UE 101a from a service. Then, the UE 101n can compare the retrieved Bluetooth MAC address form the UE 101a and the registered Bluetooth MAC address to determine if there is a match, for authentication.

In one embodiment, the system 100 determines context information associated with one or more of the UEs 101a-101n. Presenting of the first device identifier in place of the second device identifier may be based on the context information. Further, as the context information changes, the system 100 may determine to revert to the second device identifier as the discoverable identity based on the changes in the context information. The context information may include location, background sound, speed, etc. For example, the first device identifier may be presented in place of the second device identifier when a user of the UE 101a walks into a meeting room, as the context information acquired from the sensor 111 with a location sensor indicates that the location is the meeting room. Then, if the user walks out of the meeting room, the sensor 111 acquires the context information about the location and thus the UE 101 determines the changes in the location. Based on this change in the context information, the discoverable identity may be reverted back to the second device identifier from the first device identifier. In addition or alternatively, the first device identifier may be presented in place of the second device identifier as the discoverable identity, and/or the discoverable identity can be reverted back to the second device identifier from the first device identifier, based on schedules or a calendar. For example, if the UE 101 includes a calendar that indicates a meeting from 10:00 AM to 11:00 AM, the first device identifier may be presented in place of the second device identifier as the discoverable identity during this time period, and the discoverable identity is reverted back to the second device identifier after 11:00 AM. This provides advantages in that the UE 101 is discoverable to access the information about the user of the UE 101 in limited circumstances such as a business meeting where the users in the same business meeting may be interested in acquiring each other's information.

In addition, the UE 101 may examine other devices surrounding the UE 101 and determine the discoverable devices around the UE 101 (e.g. via Bluetooth scan). Then, the first device identifier may be presented in place of the second device identifier as the discoverable identity based on the other devices discovered by the UE 101. For example, the UE 101 may present the first device identifier as the discoverable identity if the other devices discovered by the UE 101 are related to the UE 101 or similar to the UE 101, or the users of the other devices are related to the user of the UE 101.

In another embodiment, the discoverable identity may be reverted to the second identifier from the first identifier after a predetermined period of time. This predetermined period of time may be set by a user, or may also be configured automatically based on conditions and/or contexts. For example, a user may set the predetermined period of time to be 30 minutes such that the discoverable identity is reverted to the second identifier 30 minutes after the first identifier is presented as the discoverable identity. Further, for example, the predetermined period of time may be set to one hour if the context information indicates that the UE 101 is in a business meeting room, and may be set to two hours if the context information indicates that the UE 101 is in a conference room.

In yet another embodiment, the system 100 rotate one or more user identifiers as the device identifier, so that over a period of time one or more user identifiers can be sequentially presented as the discoverable device identifier associated with the UE 101. In this way, if the device identifier is limited to a particular size (e.g., a WiFi SSID is limited to 32 bytes), additional information and/or user identifiers may be presented as a sequence of rotating device identifiers. The discovering UE 101 may then capture the sequence to discover the user identifiers and/or online identities of interest.

Therefore, the advantage of this approach is that the system 100 provides a simple way to conveniently share user information among the UEs 101*a*-101*n*. This approach provides a novel way to quickly discover identities of users, generally users that are relevant or that satisfy the same condition (e.g., attending the same meeting). Further, this approach provides a quick way to retrieve information about the discovered users. This approach also utilizes passcodes, encryption, and/or authentication of hardware identifiers to ensure security in information exchange. Accordingly, means for sharing user information among devices are anticipated.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). Further, the UEs 101*a*-101*n* have short range wireless connection capabilities such that the UE 101*a*-101*n* may connect to each other via the short range wireless connection, without relying on the communication network 105.

By way of example, the UEs 101*a*-101*n* and the online service 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
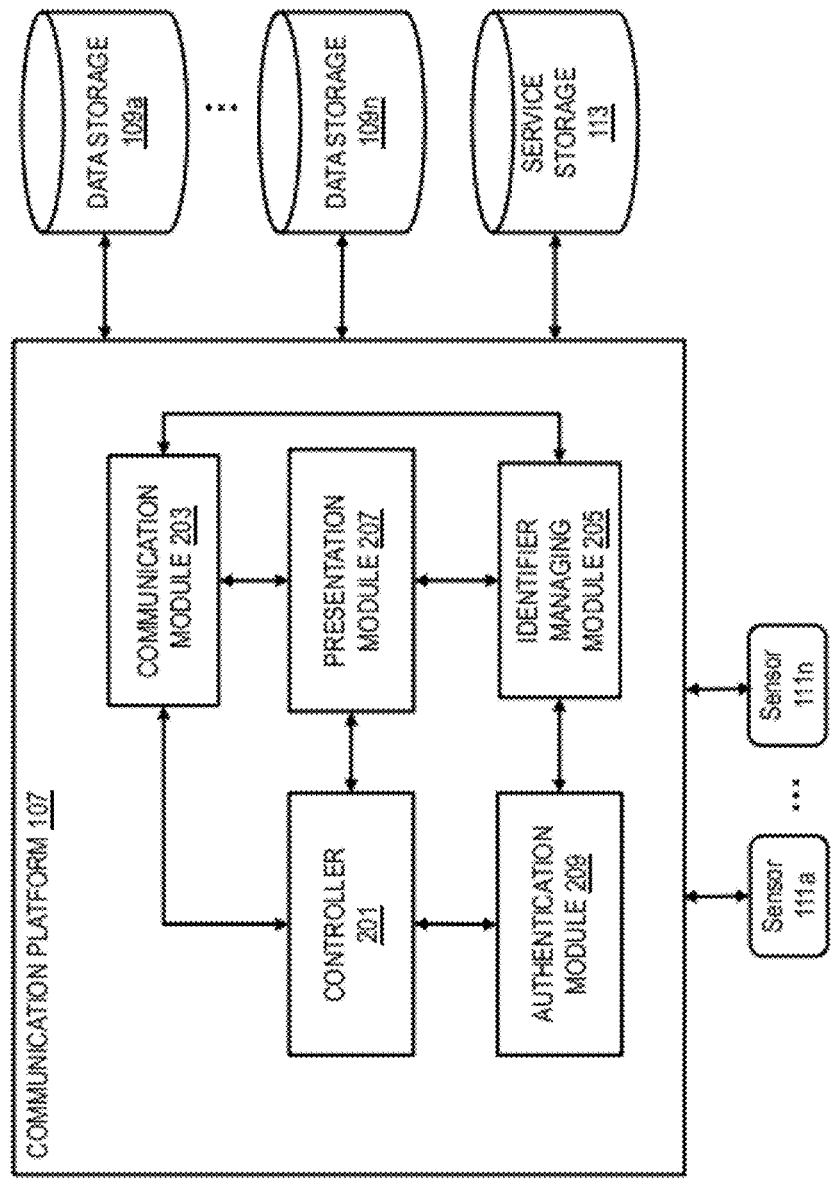
FIG. 2 is a diagram of the components of the identity discovery module, according to one embodiment.

FIG. 2 is a diagram of the components of the identity discovery module 107, according to one embodiment. By way of example, the identity discovery module 107 includes one or more components for sharing and discovering user information among devices. It is contemplated that the functions of these components may be combined in one or more components or performed by other components of equivalent functionality. In this embodiment, the identity discovery module 107 includes a controller 201, a communication module 203, an identifier managing module 205, presentation module 207, and an authentication module 209.

The controller 201 oversees tasks, including tasks performed by the communication module 203, the identifier managing module 205, the presentation module 209 and the authentication module 209. The communication module 203 manages and controls any incoming and outgoing communications such as transfer of the data between the UE 101 and the online service 103 as well as the communication between the UEs 101a-101n. By way of example, these communications include those occurring over the communication network 105 as well as those occurring locally between one or more of the UEs 101a-101n. As discussed previously, the local communications may be conducted over short range wireless communications such as Bluetooth, WiFi, near field communications, etc. The local communications, for instance, support the sharing and discovery of device identifiers.

The identifier managing module 205 manages various types of identifiers such as user identifiers, device identifiers and hardware identifiers. For example, the identifier managing module 205 stores user online identities and generates the corresponding device identifiers for sharing them for discovery. In addition, the module 205 can track existing device identifiers so that they may restored once sharing is complete. With respect to authentication, the module 205 can facilitate registration and comparison of known device and hardware identifiers to help ensure information security. The functions of the identifier managing module 205 are discussed in more detail below.

The presentation module 209 controls display of a user interface such as a graphical user interface, to convey information. For example, the presentation module 207 may manage and control display of the discovered devices (e.g., UE 101). The presentation module 207 may also manage and control display of information about a user of the discovered device. Further, the presentation module 207 may interact with the communication module 203, identifier managing module 205 and the authentication module 209 to display information provided therefrom.

The UE 101 may also be connected to storage media such as the data storage media 109 such that the identity discovery module 107 can retrieve or store data in the data storage media 109. By way of example, if the data storage media 109a-109n are not local, then the UE 101 may access them via the communication network 105. The UE 101 may also be connected to the service storage 113 via the communication network 105 such that the identity discovery module 107 may be able to manage or access information about a user or any other related data in the service storage medium 113. Further, the UE 101 may be connected to the sensor 111 such that the identity discovery module 107 may retrieve information related to context information.

Firstly, the identifier managing module 205 determines a user identifier of a user. The user identifier may be associated with the identity discovery module 107 or any other application running in the UE 101. Thus, the user identifier may be a user identifier for an application in the UE 101. As another example, the user identifier may also be associated with an application within the online service 103. After the determination of the user identifier, the identifier managing module 205 generates a first device identifier based on the user identifier. The identifier managing module 205 communicates with the presentation module 207 to present the first or generated device identifier in place of a second or original identifier as a discoverable identity of the UE 101.

In one embodiment, presenting of the first device identifier in place of the second device identifier may be based on the context information. In this embodiment, the identifier managing module 205 may determine the context information associated with the UE 101 and/or another device (e.g., another UE). The context information may be acquired by the sensor 111, and may include location, time, sound, schedule, etc. Thus, the sensor 111 may include a location sensor such as a GPS device, a sound sensor, speed sensor etc. Further, the identifier managing module 205 may also determine changes to the context information, and then may revert the discoverable identity from the first device identifier to the second device identifier based on the changes to the context information. In a case where the context information used is a location, if the sensor 111 senses that the UE 101 is in a business meeting room, then the identifier managing module 205 may determine to present the first device identifier in place of the second device identifier.

Thus, another device (e.g., a UE 101n) may discover (e.g., detect and/or identify via a network or wireless protocol) the first device identifier presented a sharing device (e.g., a UE 101a). Then, if the user carrying the UE 101a exits the business meeting room, the sensor 111 provides information about this change in context, indicating the UE 101a is no longer in the business meeting room. Based on this change, the identifier managing module 205 may revert to the second device identifier as the discoverable identity. In other words, the identifier managing module 205 withdraws sharing of the user identifiers in the first device identifier. In another embodiment, the identifier managing module 205 may revert to the second identifier as the discoverable identity after a predetermined period of time. For example, if a predetermined period of time (e.g., one hour) passes after presenting the first device identifier as the discoverable identity of the UE 101, then the identifier managing module 205 may revert to presenting the second identifier as the discoverable identity of the UE 101. After reverting back to the second identifier as the discoverable identity of the UE 101, other devices discover the UE 101 according to the second identifier.

The identifier managing module 205 may also receive a request from an application for generating the first device identifier, wherein the user identifier is associated with the application. For example, when the application is activated, the application may automatically request generating the first device identifier, such that the application may have the UE 101 present the first device identifier as the discoverable identity of the UE 101. The application may be a software application within the UE 101 that is associated with the identity discovery module 107 or the identity discovery module 107 may be a part of the application. Further, the user identifier may be the user identifier assigned by the application. In another example, the application may assign the user identifier that is identical to the user name for the service 103, especially if the service has user information under the user name. In another embodiment, when generating the first device identifier, the authentication module 209 may encrypt the user identifier, wherein the first device identifier is generated based on the encrypted user identifier.

In another embodiment, the identifier managing module 205 may associate the user identifier with functions, applications, services or a combination thereof. Then, the identifier managing module 205 includes this association in the first device identifier. For example, a user identifier Mike211 that is associated with functions, applications and services may include code or terms for each of these parameters. In one example, the codes for "downloading contact information," "using software application 1," and "using Social Networking Service 1" are respectively "DLContact," "Softw1," and "SocNet1." Accordingly, the identifier managing module 205 may generate the first device identifier to encode this information as "Mike211_DLContact_Softw1_SocNet1." Further, the identifier managing module 205 may also associate a passcode with the user identifier. As discussed previously, the passcode authenticates access to functions, applications, services or a combination thereof associated with the user identifier, and include the passcode in the first device identifier. For example, a passcode may be assigned for a service associated with the user identifier and may be included in the first device identifier, such that when another device (e.g., another UE 101n) accesses the first device identifier, the other device can use the passcode to retrieve information about the user from the service for which the passcode is assigned. Thus, if the first device identifier contains user identifier and a passcode associated with a service, another device can use the first device identifier to retrieve user information from the service based on the user identifier and the passcode.

Further, the identifier managing module 205 may determine a hardware identifier associated with the UE 101 and associate the hardware identifier with the first device identifier. In this case, the user identifier is authenticated based on the hardware identifier. If another device (e.g., another UE) accesses the first device identifier and access the hardware identifier, the other device may also receive the hardware identifier that is registered in a service or an application. Then, the other device may authenticate the accessed hardware identifier associated with the first device identifier by comparing the accessed hardware identifier and the registered hardware identifier. In one example, the hardware identifier may be a media access control (MAC) address.

Figure 3:
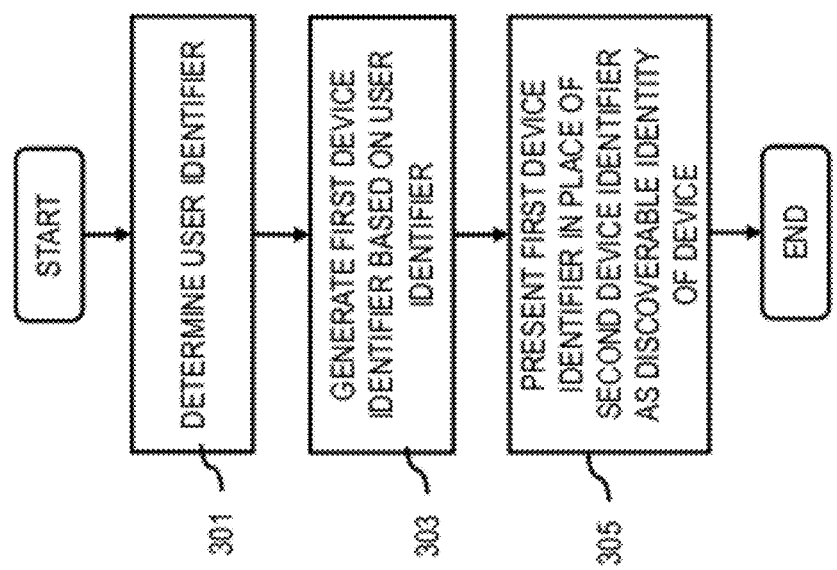
FIG. 3 is a flowchart of a process for sharing user information among devices, according to one embodiment.
Figure 9:
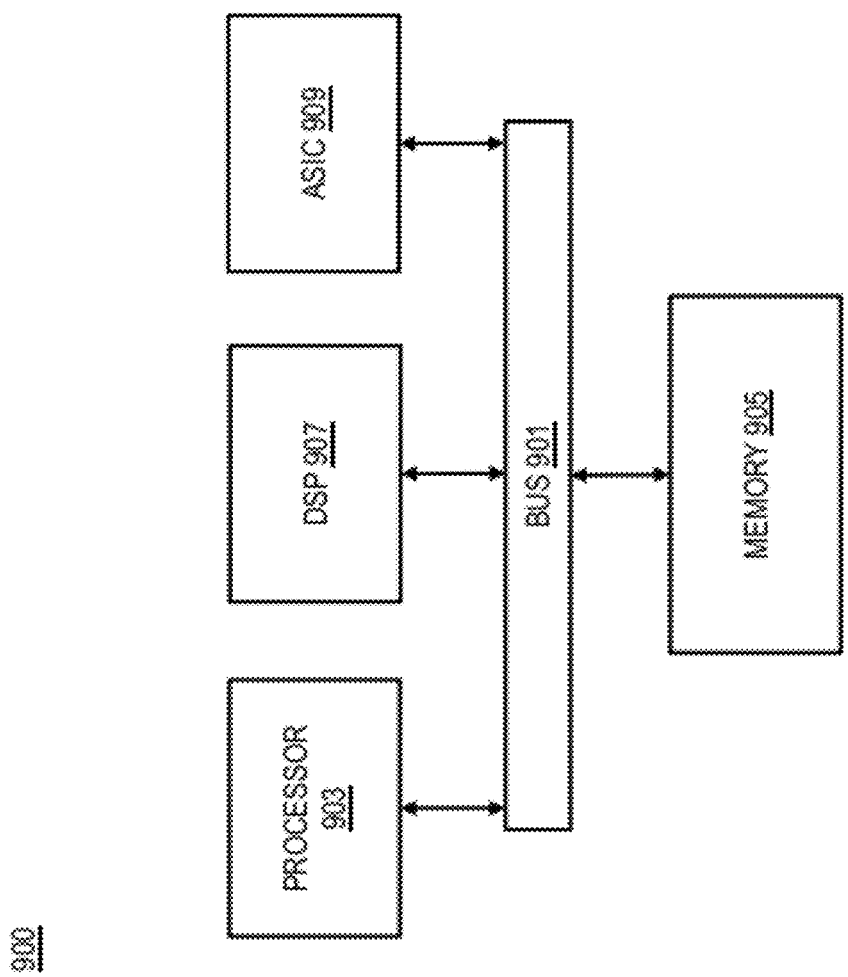
FIG. 9 is a diagram of a chip set that can be used to implement an embodiment of the invention.

FIG. 3 is a flowchart of a process for sharing user information among devices, according to one embodiment. In one embodiment, the identity discovery module 107 performs the process 300 and is implemented in, for instance, a chip set including a processor and a memory as shown in FIG. 9. In step 301, the identity discovery module 107 determines the user identifier. The user identifier may be set as a user identifier of a social networking service that the user is subscribed to. The user identifier may also be set as a user identifier that is used in the application of the UE 101. There may be multiple user identifiers for different services and/or applications, and thus may provide different types of user information depending on the service and/or the application. In step 303, the identity discovery module 107 generates a first device identifier based on the user identifier. Thus, for example, the first device identifier may include the user identifier, among other information and/or words. The first device identifier may also include a full name of the user, along with the user identifier, so as to allow other users to recognize the user more easily. Thus, the user identifier may be Mike211_Anderson, for example, showing that the user's full name is Mike Anderson. Further, the identity discovery module 107 may encrypt the user identifier such that the first device identifier is generated based on the encrypted user identifier. In one embodiment, the identity discovery module 107 may also receive a request from an application for generating the first device identifier, wherein the user identifier is associated with the application. For example, the application may be activated to generate the first device identifier, while the first device identifier is not utilized when the application is deactivated. Thus, when the application is activated, the first identifier may be generated and may be presented as a discoverable identity.

In step 305, the identity discovery module 107 presents the first device identifier in place of a second device identifier as a discoverable identity of a device. Then, an identity discovery module 107 of another device (e.g., another UE 101) may discover the first device identifier and retrieve the identity of the user. The user information may be retrieved from the UE 101 of the user and/or an online service 103 that the user is subscribed to, depending on whether the user identifier in the first device identifier guides to the UE 101 of the user or the online service 103 for the user information.

In one embodiment, the identity discovery module 107 associates the user identifiers with functions, applications, services or a combination thereof, and includes this association in the first device identifier. For example, the first device identifier may include the user identifier (e.g., Mike211) and a function (e.g., download contact information), a name of a service (e.g., SocNet1) as well as a name of the application (e.g., Software1), such that the first device identifier may be generated as <user identifier> <function> <service> <application> (e.g., Mike211_DLContact_SocNet1_Softw1). Further, in one example, the user identifier may be a user name for a particular function such that the user with the user name can perform particular functions such as accessing a high-level document, which cannot be accessed by some other users with other user names. In this example, some users may be in a higher hierarchy than other users and thus these users may have user names that are associated with certain functions that are not allowed by other users in a lower hierarchy. Thus, different functions may be available for different users.

Further, in another embodiment, the identity discovery module 107 associates a passcode with the user identifier. The passcode authenticates access to functions, applications, services or a combination thereof associated with the user identifier. Then, the identity discovery module 107 includes the passcode in the first device identifier. When another device (e.g., UE 101n) discovers the first device identifier of the device (e.g., UE 101a), then the other device may receive the passcode included in the first device identifier. Using the user identifier and the passcode for the user identifier, the other device may access functions, applications or services. For example, the user identifier and the passcode may be for a social networking service, and thus the other device may provide the user identifier and the passcode to the social networking service to retrieve the user information associated with the user identifier from the social networking service.

The identity discovery module 107 may also determine a hardware identifier associated with the device, and associate the hardware identifier with the first device identifier. The user identifier may be authenticated based on the hardware identifier. For example, the hardware identifier such as a Bluetooth MAC address may be associated with the first device identifier such that when another device (e.g., another UE 101) discovers the first device identifier, the other device may retrieve the Bluetooth MAC address along with the first device identifier. This retrieved Bluetooth MAC address may be compared with a Bluetooth MAC address that is registered under the user identifier, and if there is a match, the user identifier may be authenticated.

Further, the first device identifier and/or the second device identifier may also represent respective identifiers of wireless protocol(s) associated with the UE 101. For example, if the wireless protocol used in the communication between the UEs 101a-101n is Bluetooth, the first device identifier and/or the second device identifier may reflect this wireless protocol, and may include the term Bluetooth in the respective identifiers.

This process is advantageous in that it provides a user of the UE 101a simple way to make the UE 101 discoverable to other users that share similarities or relevance. Thus, this process enhances the user experience in that other users can quickly locate the user of relevance based on the first identifier generated by the UE 101. The identity discovery module 107 is a means for achieving this advantage.

Figure 4:
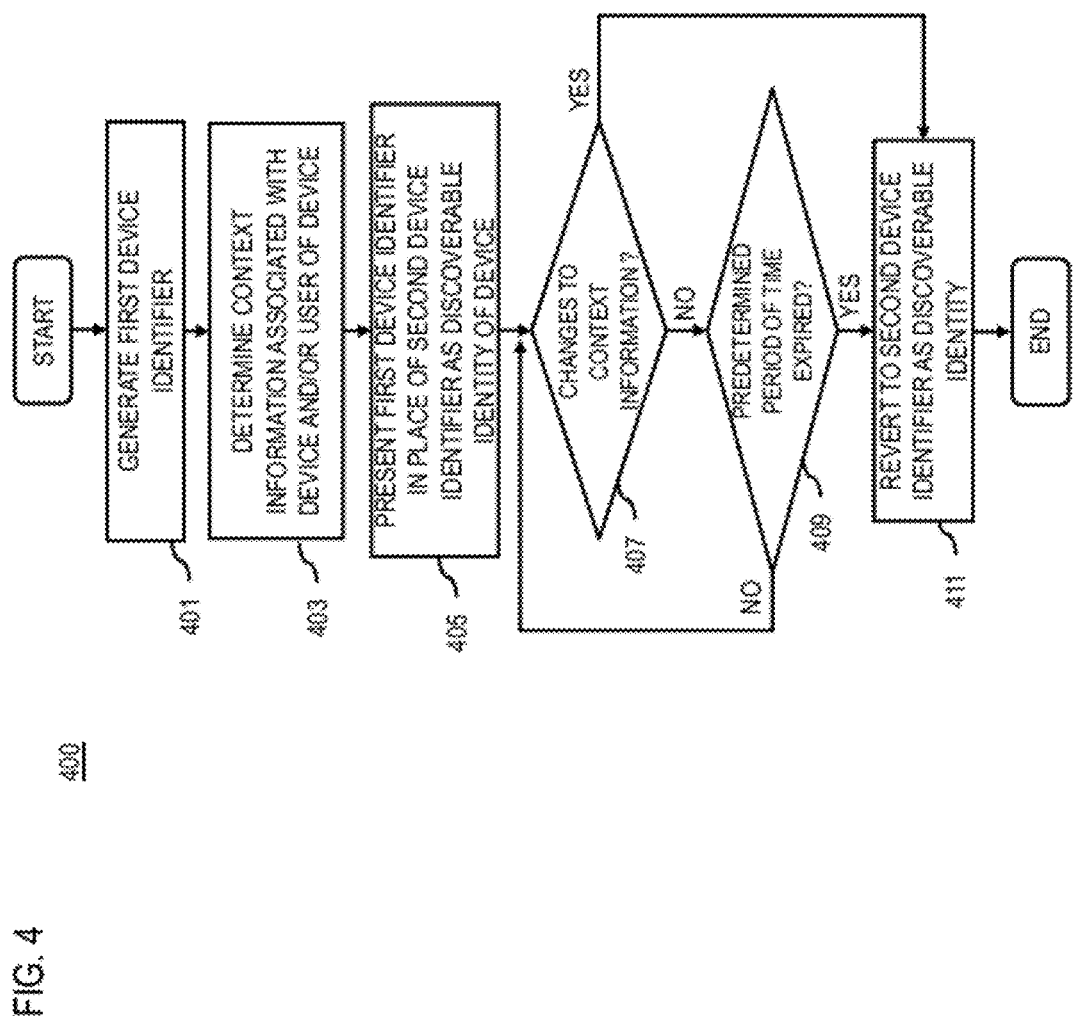
FIG. 4 is a flowchart of a process for presenting the first device identifier or the second device identifier depending on conditions, according to one embodiment.

FIG. 4 is a flowchart of a process for presenting the first device identifier or the second device identifier depending on conditions, according to one embodiment. In one embodiment, the identity discovery module 107 performs the process 400 and is implemented in, for instance, a chip set including a processor and a memory as shown in FIG. 9. In step 401, the identity discovery module 107 generates the first device identifier. The first device identifier may be generated in a method described previously. In step 403, the identity discovery module 107 determines context information associated with the device and/or a user of the device. The context information may include location information of the UE 101, the speed of the UE 101, the background sound, the time, etc. The context information may be retrieved from the sensor 111 connected to the UE 101. Thus, the sensor may be a location sensor such as the GPS device, a speed sensor, a sound sensor, etc. The context information may also incorporate a calendar or a schedule of the user, and/or events in the calendar or the schedule. For example, the schedule may indicate that the user is in a business meeting between 11:00 AM and noon, which may be considered as context information. The context information may determine whether to present the first device identifier in place of the second device identifier as the discoverable identity of device.

In step 405, if the context information triggers the presentation of the first device identifier, the identity discovery module 107 presents the first device identifier in place of a second device identifier as a discoverable identity of a device. For example, if the context information indicates that the UE 101 is in a business meeting room, then the first device identifier may be presented to make the UE 101 discoverable to other users in the business meeting. Further, in one embodiment, the context information may also determine which of the available first device identifiers to present. For example, if the context information shows that the user is in a business meeting, the first device identifier corresponding to the business meeting may be presented (e.g., including the user's business title). On the other hand, if the context information indicates that the user is in a township meeting, a corresponding first device identifier may be presented (e.g., including the user's title in the township).

In step 407, the identity discovery module 107 checks whether there are changes to the context information. If there are changes to the context information, the identity discovery module 107 reverts to the second device identifier as the discoverable identity, as shown in step 411. For example, if the context information indicates that the UE 101 is no longer in the business meeting room, then the identity discovery module 107 reverts to the second device identifier as the discoverable identity. If there are no changes in the context information, the identity discovery module 107 in step 409 determines whether a predetermined period of time has expired after beginning to present the first device identifier. If the predetermined period time has expired, then the identity discovery module 107 reverts to the second device identifier as the discoverable identity, as shown in step 411. The predetermined period of time may be manually set by a user or may be automatically set depending on various conditions such as the context information.

This process is advantageous in that it selectively provides the first device identifier as the discoverable identity depending on the context information and/or the predetermined period of time. Thus, this process ensures that the first device identifier is presented as the discoverable identity only when it is beneficial to do so. The identity discovery module 107 is a means for achieving this advantage.

Figure 5:
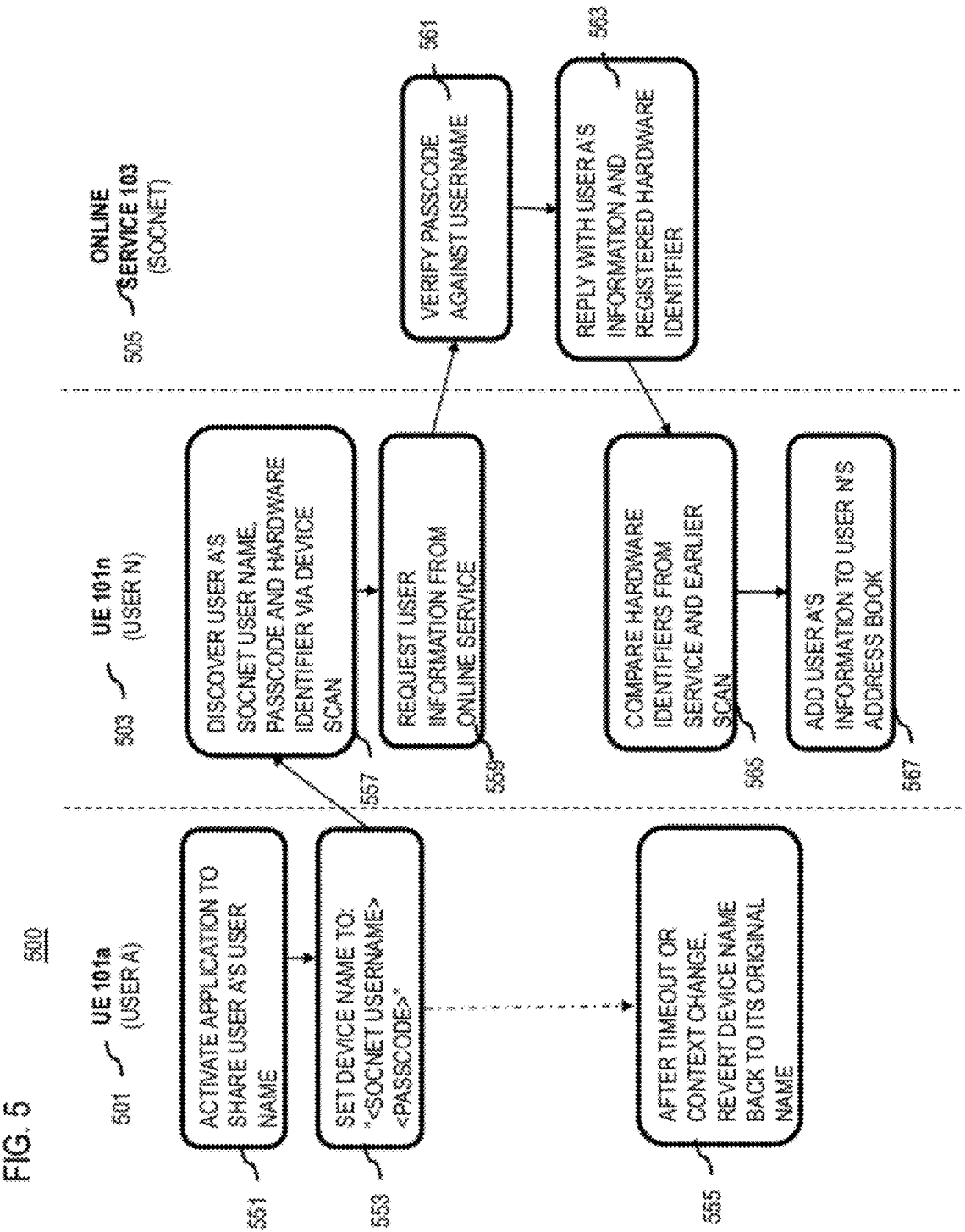
FIG. 5 is a flowchart of the overall process for sharing user information between devices, according to one embodiment.

FIG. 5 is a flowchart of the overall process for sharing user information between devices, according to one embodiment. In one embodiment, the UE 101a, the UE 101n and the online service 103 are involved in the process 500. The UE 101a section 501, the UE 101n section 503 and the online service 103 section show the steps that take place in the UE 101a, the UE 101n, and the online service 103, respectively. In step 551, the UE 101a activates an application to share user A's user name. At this point, the device name (i.e. discoverable identity) may be initially set to its original name (i.e. second identifier). When appropriate, the UE 101a sets the device name (i.e. discoverable identity) to a first device identifier, "<SOCNET USERNAME> <PASSCODE>." In this example, the user identifier is associated with the online service, SOCNET, and this user identifier is used in generating the first device identifier. This device name is reverted back to its original name after time out (i.e. expiration of a predetermined time period) or changes in context information, as shown in step 555. When the device name is set to the first device identifier, UE 101n can discover user A's SOCNET user name, the passcode associated with the user name, and a hardware identifier by performing a scan for a discoverable device, as shown in step 557. In step 559, using this information, the UE 101n requests user information from the online service 103 based on the SOCNET user name and the passcode. Then, in step 561, the online service 103 verifies the passcode against the SOCNET username. If the passcode is authenticated, then the online service 103 replies to the UE 101n with the user A's information and a registered hardware identifier. In step 565, the UE 101n compares the registered hardware identifier from the online service 103 and the hardware identifier received from the UE 101a for authentication. If this authentication is validated, the UE 101n adds user A's information to user N's address book.

Figure 6:
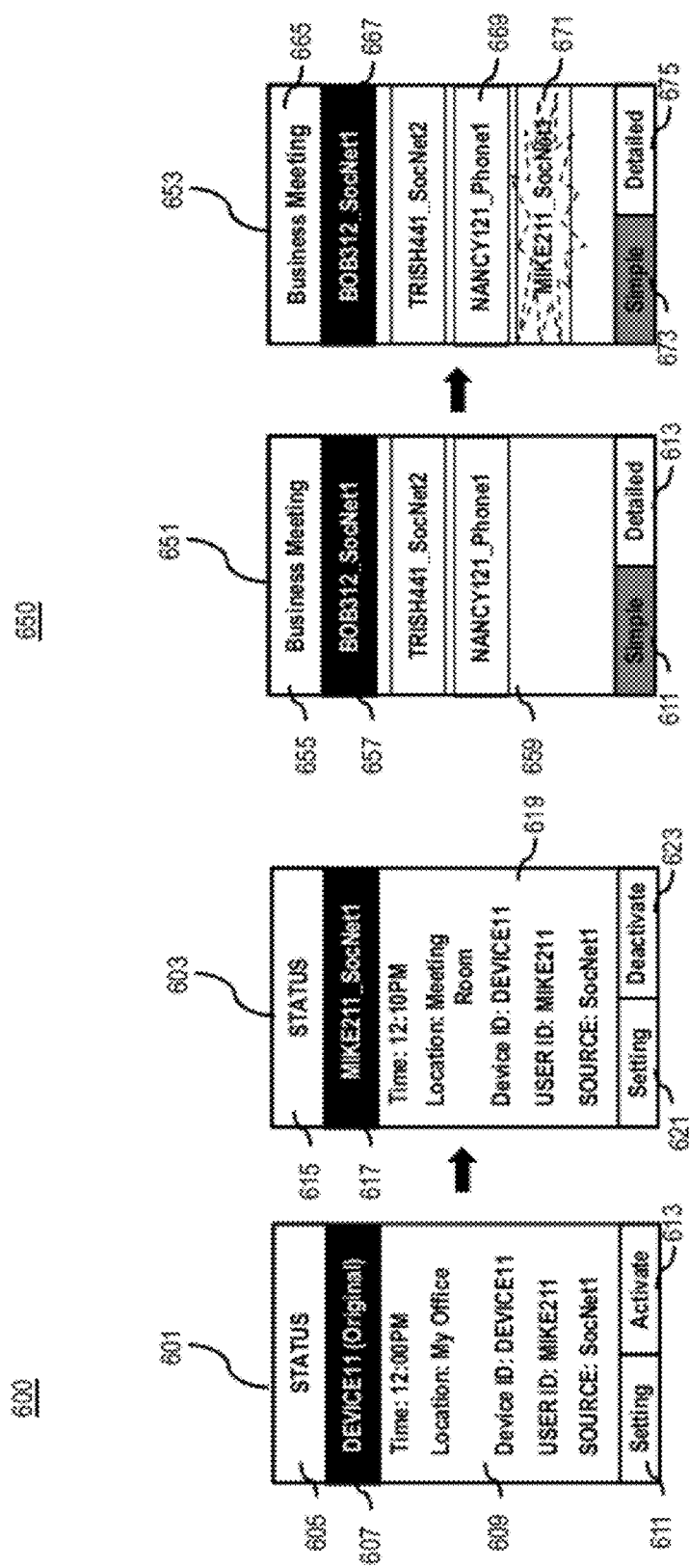
FIGS. 6A and 6B are diagrams of user interfaces utilized in the processes of FIG. 3, according to various embodiments.

FIGS. 6A and 6B are diagrams of user interfaces utilized in the processes of FIG. 3, according to various embodiments. FIG. 6A shows user interfaces of a device (e.g., UE 101a) that shares the user information. The first user interface 601 shows the user interface of the UE 101 before changing the discoverable identity of the UE 101, and the second user interface 603 shows the user interface after changing the discoverable identity. In the first user interface 601, the title bar 605 indicates that the user interface is for showing a current status of the device and parameters. The discoverable identity bar 607 shows that the discoverable identity is set as "DEVICE11" which is an original device identifier. The status section 609 shows that the current time is 12:00 PM, the location is My Office, the device identifier is DEVICE11, the user identifier is MIKE211, and the source from which the user information is to be retrieved is SocNet1, which is an online service. In this case, the device identifier DEVICE11 is set as a discoverable identity as a default identifier. The user interface 601 also includes a settings option 611 to display a user interface for configuring settings, and an Activate option 613 to activate the software that is capable of presenting the first device identifier as the discoverable identity. As the user selects the Activate option 613, the software presents the first device identifier as the discoverable identity instead of the second device identity (which is DEVICE11 in this example), if certain conditions such as context information are satisfied. In the second user interface 603, the title bar 615 indicates that the user interface is displaying the status. In this user interface 603, the discoverable identity has changed to MIKE211_SocNet1. In this example, the software is activated to present the first device identifier (e.g., MIKE211_SocNet1) if the context shows that the device is in the meeting room. The status section 619 shows that there is the location has changed from My Office to Meeting Room, which is a context that triggers presenting of another device identifier (the first device identifier) in place of an original device identifier (second device identifier). The status section 619 also shows that the time is 12:10 PM, the device identifier is DEVICE11, the user identifier is MIKE211, and the source from which the user information is to be retrieved is SocNet1. The settings option 621 is the same as the settings option 611. The Deactivate option 623 deactivates the software, which maintains the discoverable identity as the original device identifier.

FIG. 6B shows user interfaces for a device that retrieves available user devices that are discovered, such that the user information may be retrieved. The third user interface 651 shows the user interface of the UE 101 before discovering the discoverable identity MIKE211_SocNet1, shown in the second user interface 603. The fourth user interface 653 shows the user interface of the UE 101 after discovering MIKE211_SocNet1. Therefore, the first user interface 601 and the third user interface 651 are in the same time line, and the third user interface 603 and the fourth user interface 653 are in the same time line. The title bar 655 shows that the discovered users are the users in the business meeting. The discoverable identity bar 657 shows that the discoverable identity for this device is set as BOB312_SocNet1. The discovered identity list section 659 shows that two identities, TRISH441_SocNet2 and NANCY121_Phone1 are discovered. The simple option 611 is selected in this user interface 651 to only list the discoverable identifiers of the discovered identities. The detailed option 613 may be selected to show detailed user information for each discovered identity. The fourth user interface 653 includes the title bar 665 showing that the discovered users are the users in the business meeting and the discoverable identity bar 657 showing that the discoverable identity for this device is set as BOB312_SocNet1. The discovered identity list section 669 shows that two identities, TRISH441_SocNet2 and NANCY121_Phone1 are discovered, and the identity "Mike211_SocNet1 has been newly discovered, as indicated by the dotted star sign 671. As the discoverable identity is set to Mike211_SocNet1 in the user interface 603 for one device (e.g., UE 101a), another device (e.g., UE 101n) discovers this identity Mike211_SocNet1 as shown in the user interface 653. The simple option 673 and the detailed option 675 are the same as the simple option 611 and the detailed option 613.

In one embodiment, these discovered identities may have a privilege of being able to share the same working space online (e.g., a storage space in a service, documents in a shared space etc.). Further, in another embodiment, these discovered identities may have different hierarchies, allowing one user of the discovered identity in the highest hierarchy to access an entire set of information of other users, whereas the other users of the discovered identity have more limited access.

Figure 7:
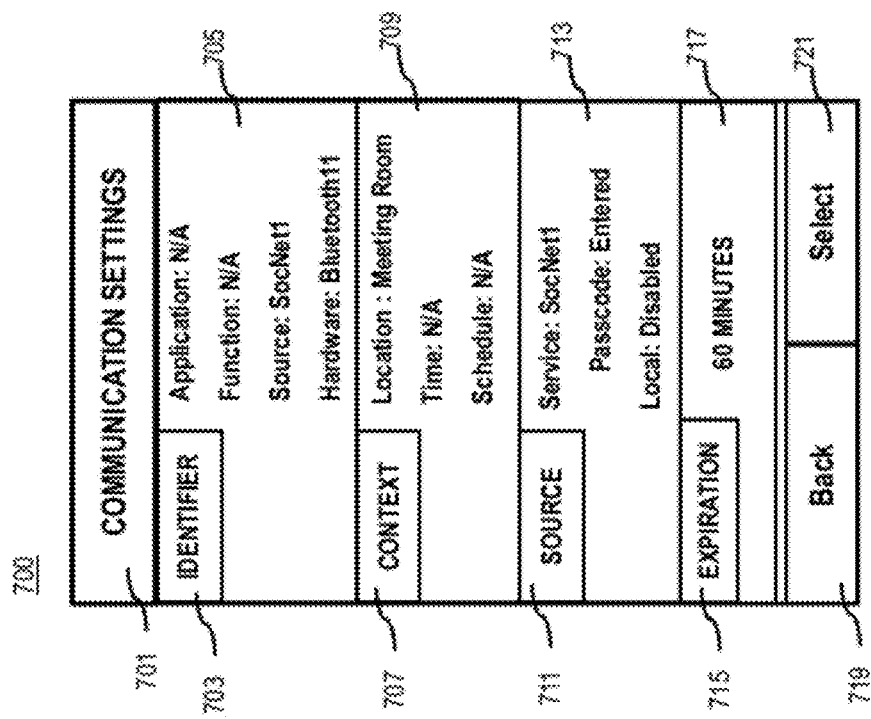
FIGS. 7A and 7B are diagrams of user interfaces corresponding to FIGS. 6A and 6B, utilized in the processes of FIG. 3, according to various embodiments.

FIGS. 7A and 7B are diagrams of user interfaces corresponding to FIGS. 6A and 6B, utilized in the processes of FIG. 3, according to various embodiments. FIG. 7A shows a user interface 700 showing settings for the UE 101 for sharing the user information, and may correspond with the user interfaces of FIG. 6A. The title bar 701 shows that the user interface is for communication settings. The identifier button 703 may be selected to set the settings for the identifier. The identifier settings section 705 shows that the identifiers for applications, functions, sources, and a device hardware may be configured. In this case, the application and function identifiers are not available, and the source identifier is SocNet1 and the hardware identifier is Bluetooth11. The context button 707 may be selected to configure the settings for context information that affects the changes of the discoverable identity. In this example, the context section 709 shows that the first device identifier is presented in place of the second identifier as the discoverable identity if the location of the UE 101 is the meeting room. The time and the schedule that affect the discoverable identity have not been configured in this example. The source button 711 may be selected to configure the source from which another device can retrieve the user information. In this example, the source section 713 shows that the online service called SocNet1 is the source, and the passcode for SocNet1 has been entered. The expiration button 715 may be selected to set a predetermined period of time during which the first device identifier is presented as the discoverable identity. The expiration section 717 in this example shows that the period has been set to 60 minutes. Thus, if the period of 60 minutes expires after presenting the first device identifier, the discoverable identity is reverted back to the second identifier. The back option 719 brings the user interface to the previous screen, and the select option 721 allows selection of one of the settings to configure the settings.

FIG. 7B shows a user interface 750 showing a detailed user information for a user with the first device identifier, MIKE211_SocNet1. The user interface 750 is for another UE 101 that discovers the discoverable identity and retrieves user information associated with the discoverable identity, and may correspond with the user interfaces of FIG. 6B. The title bar 755 shows that the discovered users are the users in the business meeting. The user information section 753 shows detailed information about the user corresponds with the first device identifier MIKE211_SocNet1. The profile picture 755, the basic information 757 including the real name, the title, and education, and the contact information 759 including a phone number, email address and the physical address are displayed in the user information section 753. Also, the download status section 761 shows that the download of the user information from the SocNet1 is complete, and the passcode section 763 shows that the passcode has been verified. The next button 765 may be selected to show the user information of the next user. Further, the Store button 767 may be selected to store the user information displayed in the user interface 750 at the UE 101. The simple option 769 may be selected in this user interface 750 to only list the discoverable identifiers of the discovered identities, as shown in FIG. 6B. In this example, the detailed option 771 is selected to show detailed user information.

The processes described herein for sharing user information among devices may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
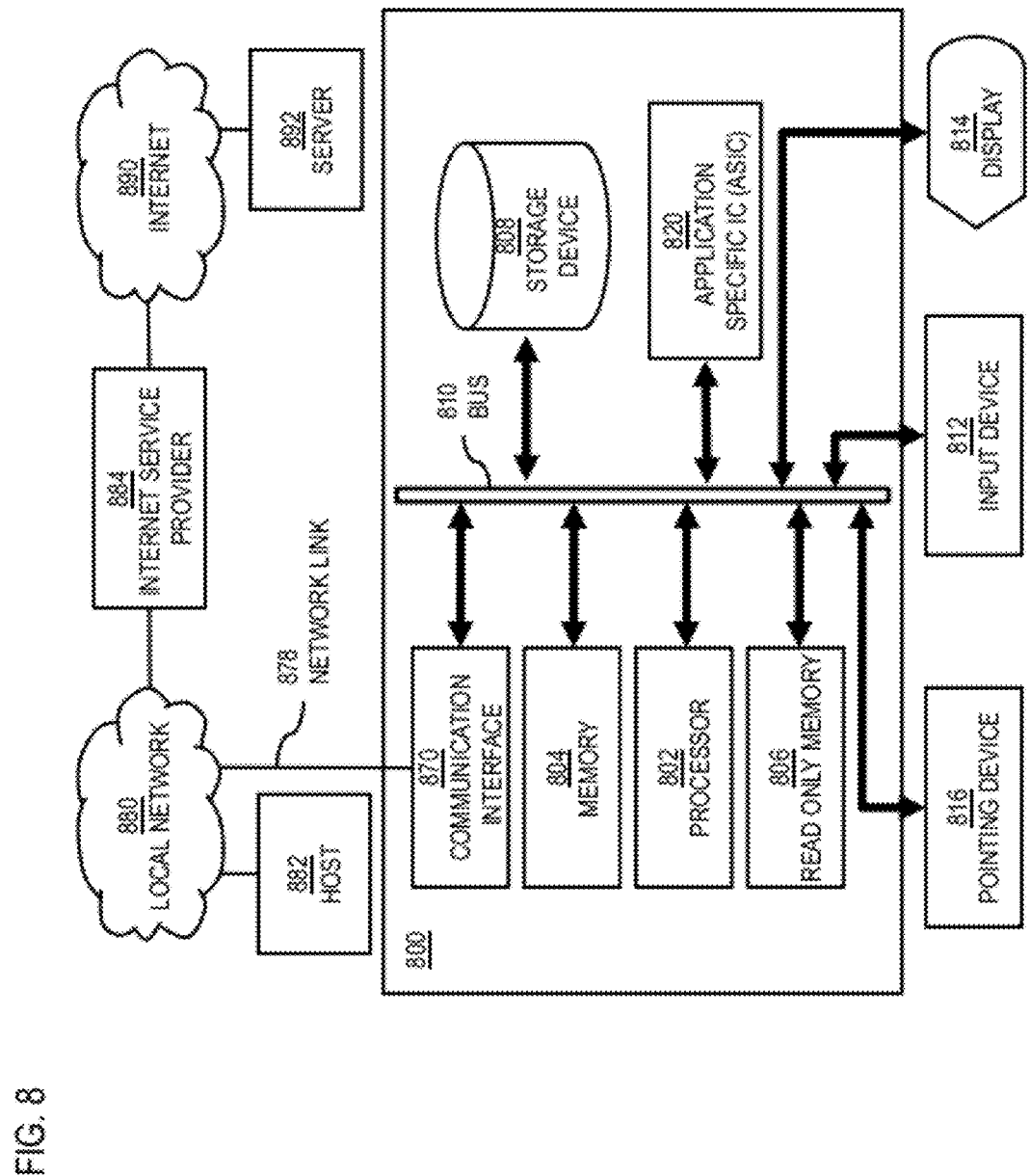
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to share user information among devices as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of sharing user information among devices.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to sharing user information among devices. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for sharing user information among devices. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for sharing user information among devices, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for sharing user information among devices.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to share user information among devices as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of sharing user information among devices.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to share user information among devices. The memory 905 also stores the data associated with or generated by the execution of the inventive steps.

Figure 10:
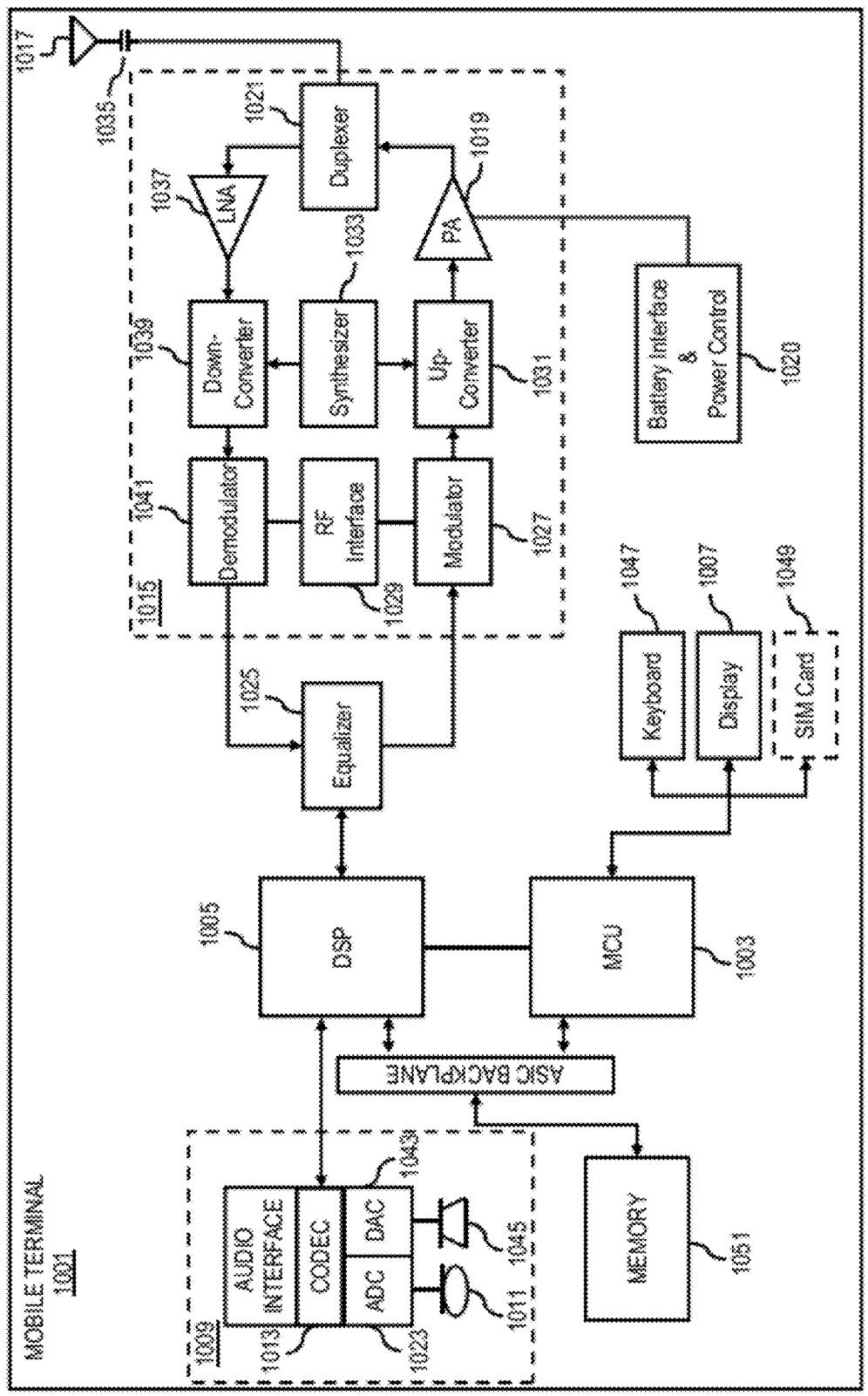
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of sharing user information among devices. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of sharing user information among devices. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to share user information among devices. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The invention claimed is:

1. A method comprising:
    determining, via a processor, one or more user identifiers;
    determining, via the processor, to generate a first device identifier based, at least in part, on the one or more user identifiers;
    determining, via the processor, to present the first device identifier in place of a second device identifier as a discoverable identity of a device;
    determining context information associated with the device, a user of the device, or a combination thereof,
    wherein the context information includes one or more of location, background sound, speed, time, sound, and schedule, and
    wherein the determining to present the first device identifier in place of the second device identifier is based, at least in part, on the context information; and
    determining to revert to the second device identifier as the discoverable identity after a predetermined period of time.

2. A method of claim 1, further comprising:
    determining one or more changes to the context information; and
    determining to revert to the second device identifier as the discoverable identity based, at least in part, on the one or more changes.

3. A method of claim 1, further comprising:
    receiving a request, from an application, for generating the first device identifier,
    wherein at least one of the one or more user identifiers is associated with the application.

4. A method of claim 1, further comprising:
    determining to encrypt the one or more user identifiers, wherein the generating of the first device identifier is based, at least in part, on the encrypted one or more user identifiers.

5. A method of claim 1, further comprising:
    determining to associate the one or more user identifiers with one or more functions, one or more applications, one or more services, or a combination thereof; and
    determining to include the association in the first device identifier.

6. A method of claim 1, further comprising:
    determining to associate a passcode with the one or more user identifiers, wherein the passcode authenticates access to one or more functions, one or more applications, one or more services, or a combination thereof associated with the one or more user identifiers; and
    determining to include the passcode in the first device identifier.

7. A method of claim 1, further comprising:
    determining one or more hardware identifiers associated with the device; and
    determining to associate the one or more hardware identifiers with the first device identifier,
    wherein the one or more user identifiers are authenticated based, at least in part, on the one or more hardware identifiers.

8. A method of claim 1, wherein the first device identifier and the second device identifier represent respective identifiers of one or more wireless protocols associated with the device.

9. An apparatus comprising:
    at least one processor; and
    at least one memory including computer program code for one or more programs,
    the at least one memory and the computer program code configured to, with the at least one processor, cause the apparatus to perform at least the following:
    determine one or more user identifiers;

determine to generate a first device identifier based, at least in part, on the one or more user identifiers;

determine to present the first device identifier in place of a second device identifier as a discoverable identity of a device;

determine context information associated with the device, a user of the device, or a combination thereof, wherein the context information includes one or more of location, background sound, speed, time, sound, and schedule, and wherein the determine to present the first device identifier in place of the second device identifier is based, at least in part, on the context information; and determine to revert to the second device identifier as the discoverable identity after a predetermined period of time.

10. An apparatus of claim 9, wherein the apparatus is further caused to:

determine one or more changes to the context information; and determine to revert to the to the second device identifier as the discoverable identity based, at least in part, on the one or more changes.

11. An apparatus of claim 9, wherein the apparatus is further caused to:

receive a request, from an application, for generating the first device identifier, wherein at least one of the one or more user identifiers is associated with the application.

12. An apparatus of claim 9, wherein the apparatus is further caused to:

determine to associate the one or more user identifiers with one or more functions, one or more applications, one or more services, or a combination thereof; and determine to include the association in the first device identifier.

13. An apparatus of claim 9, wherein the apparatus is further caused to:

determine one or more hardware identifiers associated with the device; and determine to associate the one or more hardware identifiers with the first device identifier, wherein the one or more user identifiers are authenticated based, at least in part, on the one or more hardware identifiers.

14. A non-transitory computer-readable storage medium carrying one or more sequences of one or more instructions which, when executed by one or more processors, cause an apparatus to at least perform the following steps:

determining one or more user identifiers;

determining to generate a first device identifier based, at least in part, on the one or more user identifiers;

determining to present the first device identifier in place of a second device identifier as a discoverable identity of a device;

determining context information associated with the device, a user of the device, or a combination thereof, wherein the context information includes one or more of location, background sound, speed, time, sound, and schedule, and wherein the determining to present the first device identifier in place of the second device identifier is based, at least in part, on the context information; and determining to revert to the second device identifier as the discoverable identity after a predetermined period of time.

15. A non-transitory computer-readable storage medium of claim 14, wherein the apparatus is caused to further perform:

determining one or more changes to the context information; and determining to revert to the to the second device identifier as the discoverable identity based, at least in part, on the one or more changes.

* * * * *